(12) United States Patent
Kori et al.

(10) Patent No.: US 8,259,452 B2
(45) Date of Patent: Sep. 4, 2012

(54) ELECTRONIC DEVICE

(75) Inventors: Katsushige Kori, Osaka (JP); Masaki Ikari, Osaka (JP)

(73) Assignee: KYOCERA Corporation, Kyoto (JP)

( * ) Notice: Subject to any disclaimer, the term of this patent is extended or adjusted under 35 U.S.C. 154(b) by 864 days.

(21) Appl. No.: 12/391,957

(22) Filed: Feb. 24, 2009

(65) Prior Publication Data

US 2009/0221334 A1 Sep. 3, 2009

(30) Foreign Application Priority Data

Mar. 3, 2008 (JP) ................................. 2008-051749

(51) Int. Cl.
*H05K 5/00* (2006.01)
(52) U.S. Cl. ........ 361/730; 361/724; 361/752; 361/757; 361/796; 455/90.1; 455/90.3; 455/300; 455/550.1; 455/566; 455/575.1; 455/575.3; 455/575.4; 455/575.7; 455/575.8; 379/433.13; 704/200; 206/320; 16/221; 16/367

(58) Field of Classification Search .................. 361/730, 361/680, 681, 724, 752, 757, 796; 455/90.1, 455/90.3, 300, 550.1, 566, 575; 378/433.13; 704/200; 206/320; 16/221, 367
See application file for complete search history.

(56) References Cited

FOREIGN PATENT DOCUMENTS
JP         07-226894         8/1995

*Primary Examiner* — Xiaoliang Chen
(74) *Attorney, Agent, or Firm* — Procopio, Cory, Hargreaves & Savitch LLP

(57) ABSTRACT

An electronic device according to the present invention comprises a pair of housings coupled to each other openably and closably by a hinge mechanism, and each of the housings comprises a front cabinet and a back cabinet joined to each other. The back cabinet of at least one of the housings is formed from a material having a greater expansion coefficient than that of a material forming the front cabinet, and the back cabinet of at least one of the housings has a cutting part extending in the width direction perpendicular to the longitudinal direction thereof and longitudinally cutting at least a part of the back cabinet.

5 Claims, 4 Drawing Sheets

CROSS-SECTIONAL VIEW ALONG LINE A-A

ELECTRONIC DEVICE

CROSS REFERENCE TO RELATED APPLICATION

This application claims priority under 35 U.S.C. 119 to Japan Application Number 2008-51749 filed Mar. 3, 2008. Japan Application Number 2008-51749 is incorporated by reference herein.

BACKGROUND OF THE INVENTION

1. Field of the Invention

The present invention relates to electronic devices such as a portable telephone.

2. Description of Related Art

A portable telephone comprises an operation-side housing 7 and a display-side housing 8 coupled to each other by a hinge mechanism 9 openably and closably as shown in FIG. 5. The operation-side housing 7 comprises a front cabinet 71 and a back cabinet 72 both made of synthesis resin joined to each other, while the display-side housing 8 comprises a front cabinet 81 and a back cabinet 82 both made of synthesis resin joined to each other.

In such a portable telephone, the front cabinet 81 of the display-side housing 8 is formed from a synthesis resin having a relatively high stiffness such as a polyamide MXD6 composite molding material, while the back cabinet 82 is formed from a synthesis resin having a relatively low stiffness such as polycarbonate.

By forming the front cabinet 81 and back cabinet 82 from such two kinds of synthesis resins, the stiffness of the entire housing increases and the engagement operation by means of the elasticity of the hook mechanism for engaging both the cabinets 81 and 82 to each other becomes smooth.

However, the portable telephone shown in FIG. 5 has a problem of having warpage in the display-side housing 8 as shown by the two-dot chain lines in the figure when exposed to a high temperature environment. This is because the synthesis resin forming the back cabinet 82 of the display-side housing 8, such as polycarbonate, has a greater linear expansion coefficient than the polyamide MXD6 composite molding material forming the front cabinet 81. In other words, when exposed to a high temperature environment, the back cabinet 82 greatly expands in a longitudinal direction thereof to warp as shown by the two-dot chain lines in FIG. 5, and along with such warpage, the front cabinet 81 also warps as shown by the two-dot chain lines in FIG. 5. This can result in a great gap between the operation-side housing 7 and the display-side housing 8.

For the problem of having the warpage on the housing and the gap between the housings as described above, conventionally, a countermeasure has been taken by modifying the cabinet structure to absorb the heat expansion of the synthesis resin. However, the electronic device on which the conventional countermeasure is taken has a problem of the growth in size and increase in weight due to the complexity of structure associated with the modification of the cabinet structure.

SUMMARY OF THE INVENTION

An object of the present invention is to provide an electronic device which can prevent the warpage on the housing and the gap between the housings due to the heat expansion by the slight modification of the device without the growth in size and increase in weight.

An electronic device according to the present invention comprises a housing 2 having two flat cabinets 21, 22 joined to each other to define an interior space therebetween. The material forming one cabinet 22 (such as a synthesis resin) has a greater expansion coefficient than the material forming the other cabinet 21 (such as a synthesis resin). The one cabinet is provided with a cutting part extending in the width direction perpendicular to the longitudinal direction thereof for longitudinally cutting at least a part of the cabinet. As the cutting part, for example, it is possible to adopt an opening defined in the central part in the width direction of the cabinet.

According to the electronic device of the present invention described above, when the one cabinet 22 constituting the housing has a greater heat expansion than the other cabinet 21 due to its greater expansion coefficient, although the warpage associated with the heat expansion occurs on both sides of the cutting part, it is not continuous, and it is discontinuous at the cutting part. As a result, the amount of warpage of the one cabinet 22 having the greater expansion coefficient is small compared to the conventional cabinet without the cutting part, whereby the amount of warpage of the other cabinet 21 is also small.

Also, the electronic device according to the present invention comprises a pair of housings 1, 2 coupled to each other openably and closably by a hinge mechanism 3. Each of the housings 1, 2 comprises a front cabinet and a back cabinet, and at least one housing 2 includes a back cabinet 22 formed from the material having a greater expansion coefficient than that of the material forming the front cabinet 21. And the back cabinet 22 of the at least one housing 2 is provided with a cutting part extending in the width direction perpendicular to the longitudinal direction thereof and longitudinally cutting at least a part of the back cabinet 22.

According to the electronic device of the present invention described above, when the back cabinet 22 constituting the one housing 2 have a greater heat expansion than the front cabinet 21 due to its greater expansion coefficient, although the warpage associated with the heat expansion occurs on both sides of the cutting part, it is not continuous, and it is discontinuous at the cutting part.

As a result, the amount of warpage of the one cabinet 22 having the greater expansion coefficient is small compared to the conventional cabinet without the cutting part, whereby the amount of warpage of the other cabinet 21 is also small.

In a particular configuration, the cutting part is defined at the location close to the hinge mechanism 3 of the back cabinet 22. In this particular configuration, the increase in the amount of warpage due to the lever ratio with the origin point at the position of the hinge mechanism 3 is prevented, and the warpage of the housing 2 can be inhibited to the minimum.

As described above, according to the electronic device of the present invention, it is possible to effectively prevent the occurrence of warpage and gap due to the heat expansion without the growth in size or increase in weight by slightly modifying one of the cabinets constituting the housing to define the cutting part such as an opening.

DETAILED DESCRIPTION OF THE PREFERRED EMBODIMENT

Figure 1:
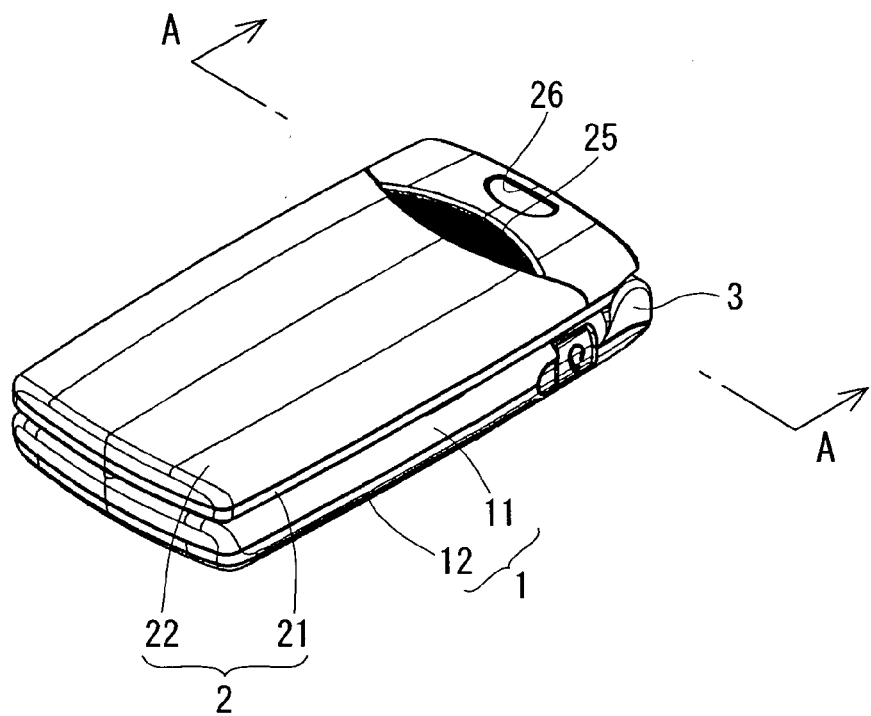
FIG. 1 is a perspective view of a portable telephone which is an embodiment of the present invention.

In a preferred embodiment discussed in detail below with reference to drawings, the present invention is implemented in a portable telephone. As shown in FIG. 1, a portable telephone which is an embodiment of the present invention comprises an operation-side housing 1 and a display-side housing 2 coupled to each other openably and closably by a hinge mechanism 3. Here, the operation-side housing 1 has a greater thickness than the display-side housing 2 does.

The operation-side housing 1 comprises a front cabinet 11 formed from a polyamide MXD6 composite molding material and a back cabinet 12 formed from polycarbonate joined to each other. Also, the display-side housing 2 comprises a front cabinet 21 formed from a polyamide MXD6 composite molding material and a back cabinet 22 formed from polycarbonate joined to each other.

Figure 2:
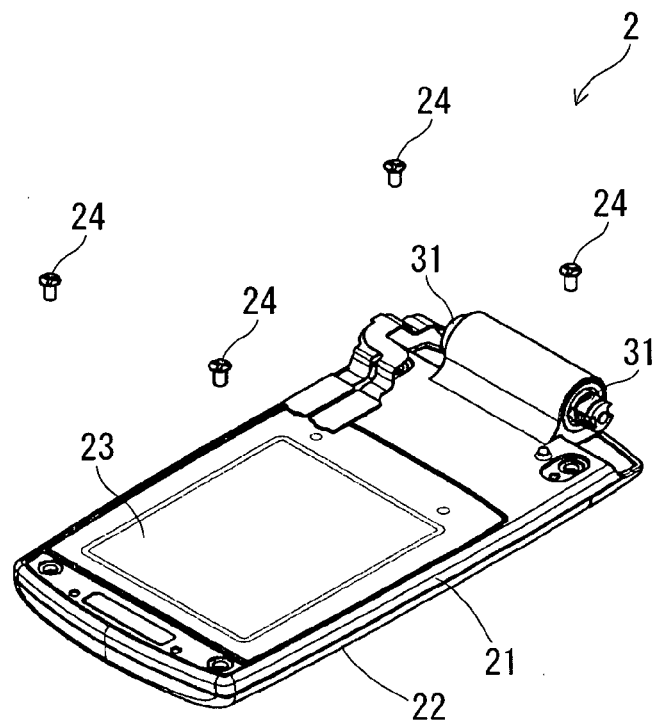
FIG. 2 is a perspective view of a display-side housing.

As shown in FIG. 2, the display-side housing 2 includes a display 23 on the front surface of the front cabinet 21, and a pair of hinge units 31, 31 constituting the hinge mechanism 3 at the end part thereof. The end part of the operation-side housing 1 is coupled to the pair of hinge units 31, 31.

In the display-side housing 2, the front cabinet 21 and the back cabinet 22 are engaged to each other via the hook mechanism (not shown) and the engaged cabinets 21, 22 are joined and fixed to each other by a plurality of screws 24.

Figure 3:
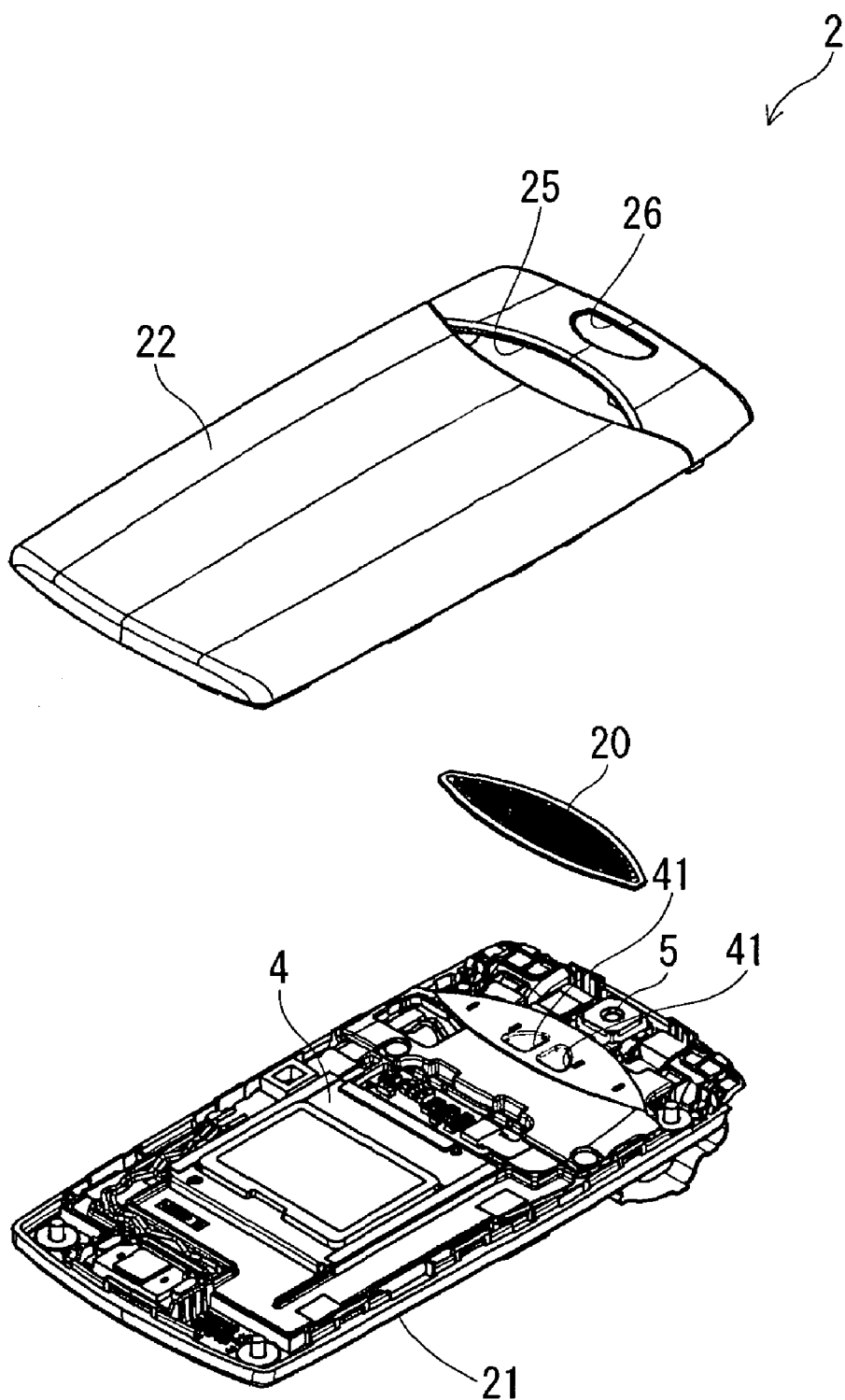
FIG. 3 is an exploded perspective view of the display-side housing.

As shown in FIG. 3, the display-side housing 2 includes a chassis 4 between the front cabinet 21 and back cabinet 22. The chassis 4 has a display and a circuit board and the like mounted thereon. Also, the front cabinet 21 has a camera 5 mounted thereon.

Figure 4:
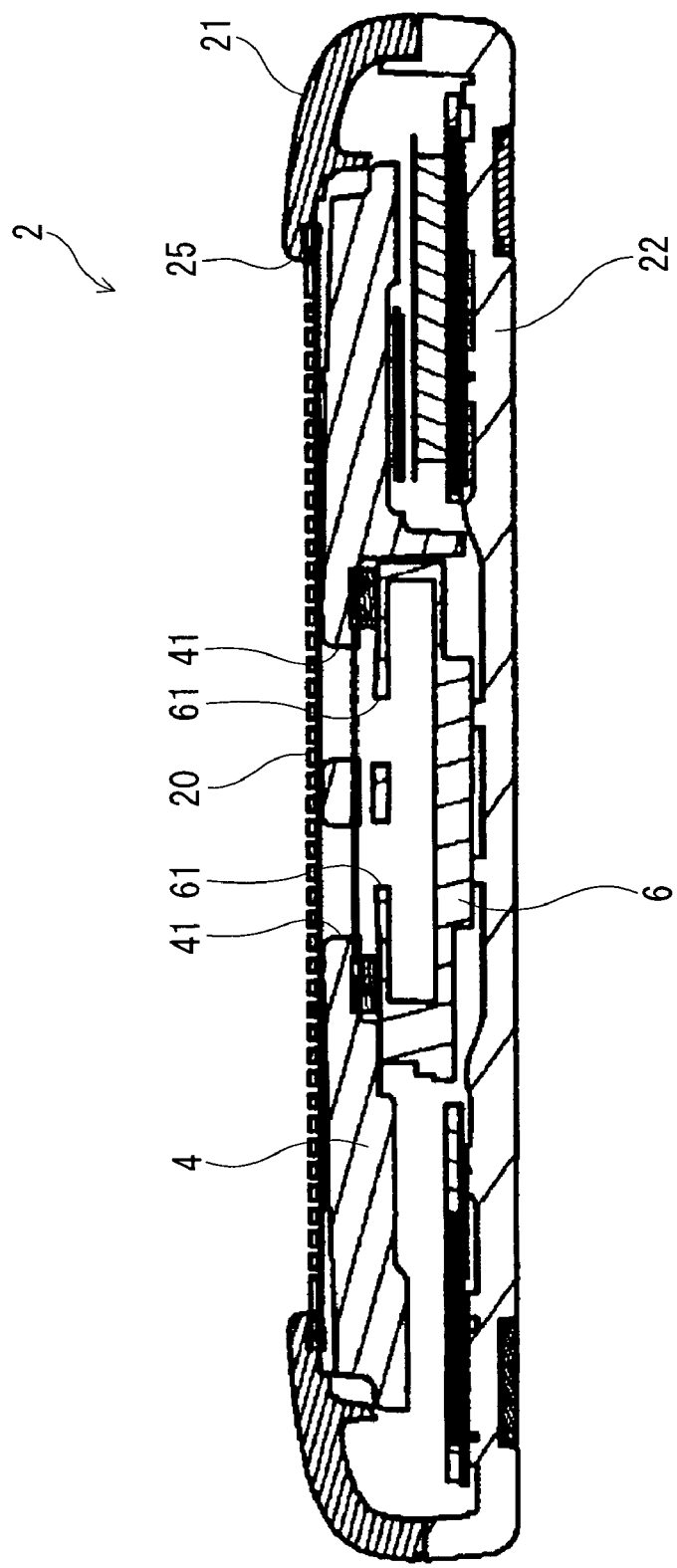
FIG. 4 is a cross-sectional view along the line A-A of FIG. 1.
Figure 5:
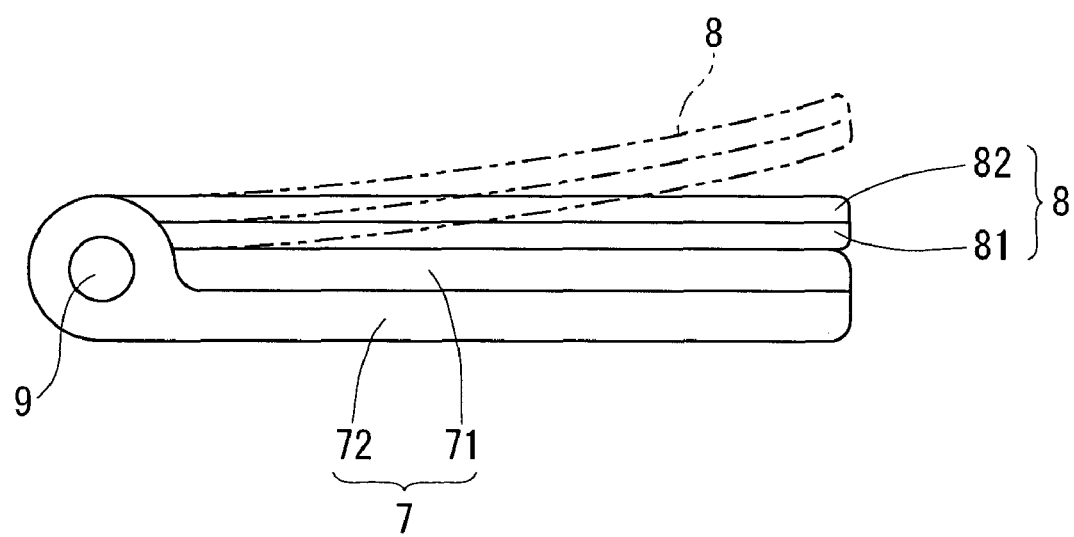
FIG. 5 is a side view explaining a warpage occurring in a conventional portable telephone.

Further, as shown in FIG. 4, a speaker 6 is provided on the front cabinet 21 of the display-side housing 2. The speaker 6 is disposed close to the hinge mechanism 3. The chassis 4 is provided with two through holes 41, 41 communicated with two sound emission holes 61, 61 of the speaker 6.

As shown in FIG. 3, the back cabinet 22 of the display-side housing 2 is provided with an opening 25 at the position corresponding to the through holes 41, 41 of the chassis 4, and a window 26 at the position corresponding to the camera 5.

The opening 25 of the back cabinet 22 has a horizontally long shape extending over substantially the entire length in the width direction perpendicular to the longitudinal direction of the back cabinet 22, and defines a cutting part longitudinally cutting substantially the entire length in the width direction of the back cabinet 22. However, the opening 25 does not extend to both end parts of the back cabinet 22 in the width direction of the back cabinet 22. Here, the opening 25 of the back cabinet 22 is much greater than the sound emission holes 61, 61 of the speaker 6 and the through holes 41, 41 of the chassis 4 as shown in FIG. 4.

On the front surface of the chassis 4, a waterproof sheet 20 which is slightly greater than the opening 25 of the back cabinet 22 is provided, covering the two through holes 41, 41. The waterproof sheet 20 is provided with many small holes to have a function for preventing water from invading via the opening 25 of the back cabinet 22, as well as a function for letting sound from the speaker 6 pass therethrough.

In the portable telephone described above, as shown in FIG. 1, the display-side housing 2 is thinner than the operation-side housing 1, and therefore, the display-side housing 2 has a tendency to have a great warpage due to the difference in the linear expansion coefficients between the front cabinet 21 and back cabinet 22. However, since the back cabinet 22 having a greater linear expansion coefficient has the horizontally long opening 25 extending over substantially the entire length in the width direction of the back cabinet 22 at the position close to the hinge mechanism 3, when the back cabinet 22 has a greater heat expansion than that of the front cabinet 21 due to its great linear expansion coefficient, although the warpage associated with the expansion occurs on both sides of the opening 25, it is not continuous, and it is discontinuous at the opening 25.

Since each warpage on both sides of the opening 25 occurs individually, the amount of warpage of the entire back cabinet 22 is smaller than the sum of the warpages on both sides of the opening 25. As a result, the amount of warpage of the back cabinet 22 having a greater linear expansion coefficient is small compared to the amount of warpage of the conventional cabinet without the opening 25, whereby the amount of warpage of the front cabinet 21 is also small.

Particularly, the opening 25 is defined at the position close to the hinge mechanism 3. Therefore, in contrast to the portable telephone with the opening 25 defined at the position close to the end opposite to the hinge mechanism 3, the increase in the amount of warpage due to the lever ratio with the origin point at the position of the hinge mechanism 3 is prevented, and the amount of warpage on the housing 2 on the basis of the hinge mechanism 3 can be inhibited to the minimum.

In the portable telephone described above, since the opening 25 also has a function as a sound emission hole to let sound from the speaker 6 pass therethrough, it is not necessary to provide a sound emission hole separately from the opening 25 on the back cabinet 22.

Further, since the opening 25 does not extend to both end parts of the back cabinet 22 in the width direction of the back cabinet 22, it is possible to obtain the effect of inhibiting the warpage while maintaining the stiffness of the back cabinet 22.

Also, it is possible that the operation-side housing 1 has the warpage due to the difference in the linear expansion coefficients between the front cabinet 11 and the back cabinet 12, however, since the operation-side housing 1 is thicker than the display-side housing 2, and includes the circuit board and other components with high stiffness disposed therein, the operation-side housing 1 has the smaller amount of warpage than the display-side housing 2. Therefore, the countermeasure against the warpage by means of the opening described above is not taken on the back cabinet 12 of the operation-side housing 1.

The present invention is not limited to the foregoing embodiment in construction but can be modified variously by one skilled in the art without departing from the spirit of the invention as set forth in the appended claims. For example, on the back cabinet 22 of the display-side housing 2, it is possible to define a cutting part which completely divides the back cabinet 22 into two in the longitudinal direction of the display-side housing 2 instead of the opening 25 as a countermeasure against the warpage. In this case, it is desirable to take some reinforcement measures to prevent the decrease in stiffness of the back cabinet 22. The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An electronic device, comprising:
    a pair of housings coupled to each other openably and closably by a hinge mechanism,
    wherein each of the housings comprises a front cabinet and a back cabinet joined to each other, and
    the back cabinet of at least one of the housings is formed from a material having a greater expansion coefficient than that of a material forming the front cabinet,
    the back cabinet of the at least one of the housings having a cutting part extending in a width direction perpendicular to a longitudinal direction thereof and longitudinally cutting at least a part of the back cabinet.

2. The electronic device according to claim 1, wherein the back cabinet of the at least one of the housings has an opening long in the width direction perpendicular to the longitudinal direction thereof, and the opening defines the cutting part.

3. The electronic device according to claim 2, wherein the one of the housings includes a speaker built therein, and the opening is greater than a sound emission hole of the speaker, and communicates with the sound emission hole.

4. The electronic device according to claim 1, wherein the one of the cabinets includes end parts in a width direction and the cutting part extends over substantially an entire length in the width direction of the back cabinet, but does not extend to both end parts in the width direction of the back cabinet.

5. The electronic device according to claim 1, wherein the cutting part is defined at a position close to the hinge mechanism of the back cabinet.

* * * * *